US006931429B2

United States Patent
Gouge et al.

(10) Patent No.: US 6,931,429 B2
(45) Date of Patent: Aug. 16, 2005

(54) ADAPTABLE WIRELESS PROXIMITY NETWORKING

(75) Inventors: David Wayne Gouge, Brenham, TX (US); William Joseph Ferris, Houston, TX (US)

(73) Assignee: Left Gate Holdings, Inc., Missouri City, TX (US)

( * ) Notice: Subject to any disclaimer, the term of this patent is extended or adjusted under 35 U.S.C. 154(b) by 779 days.

(21) Appl. No.: 09/844,701

(22) Filed: Apr. 27, 2001

(65) Prior Publication Data

US 2003/0208595 A1 Nov. 6, 2003

(51) Int. Cl.[7] .............................................. G06F 15/16
(52) U.S. Cl. ...................................... 709/203; 709/225
(58) Field of Search ................................ 709/203, 225; 455/463, 422.1, 435.1, 434

(56) References Cited

U.S. PATENT DOCUMENTS

| | | | |
|---|---|---|---|
| 6,212,392 B1 | | 4/2001 | Fitch et al. |
| 6,321,092 B1 | | 11/2001 | Fitch et al. |
| 6,356,905 B1 | * | 3/2002 | Gershman et al. ............. 707/10 |
| 6,501,956 B1 | * | 12/2002 | Weeren et al. ............... 455/463 |
| 6,629,143 B1 | * | 9/2003 | Pang ........................... 709/226 |
| 6,681,259 B1 | * | 1/2004 | Lemilainen et al. ........ 709/250 |
| 6,766,298 B1 | * | 7/2004 | Dodrill et al. ........... 704/270.1 |
| 6,779,025 B1 | * | 8/2004 | Wolfe et al. ................. 709/219 |

* cited by examiner

Primary Examiner—Mehmet B. Geckil
(74) Attorney, Agent, or Firm—Thompson & Knight LLP; James J. Murphy

(57) ABSTRACT

System and method for dynamic delivery of services and applications from a server to mobile computing devices in a wireless proximity framework. This wireless proximity framework allows users of mobile computing devices to dynamically access services and applications available in a given geographic area without preinstalling software for each service or application. Further, the wireless proximity framework allows developers to more quickly and easily adapt existing non-wireless services for use by heterogeneous mobile computing devices. Still further, the wireless proximity framework allows for services and applications to be delivered in a customized manner to each mobile computing device.

9 Claims, 7 Drawing Sheets

ADAPTABLE WIRELESS PROXIMITY NETWORKING

BACKGROUND OF THE INVENTION

1. Field of the Invention

The present invention relates generally to the fields of dynamic service provision in a wireless framework. More particularly, the present invention provides for interactions between one or more mobile computing devices and heterogeneous application servers.

2. Background of the Invention

The 1990's saw the rapid expansion and adoption of the Internet (and related technology) by businesses, universities and homes. Corporations invested heavily in building technology infrastructures consisting of servers, networks, and user stations that tied together operations around the world. With the advent of this new communications medium, organizations along with individual users enjoyed the ability to access, present, and manage information that users demanded.

Technology continues to develop into smaller, faster, and less expensive devices. IT infrastructures are extending themselves right into the user's hand via wireless technology. No longer confined by wire-based network connections, users are free to move about the globe accessing data at any time and any place. Along with this mobility comes the demand for a larger number of new software applications involving the combination of a much wider range of technology.

Mobile computing devices ("MCDs") are one of the newer innovations in computer technology, and sales of MCDs now include personal digital assistants ("PDAs"), palmtop PC's, and handheld wireless communication devices. Traditionally, MCDs allow users to organize personal affairs, write memos, calculate equations, record contact numbers in an address book, and run other basic software applications. However, mobile computing devices have largely been limited in the applications that that they could run due to several factors including: limited processing power/speed; the need to individually select and download useful applications; power consumption/battery life; and/or limited memory and storage. Accordingly, many useful applications are not developed for MCDs because of the limited computing resources possessed by many MCDs. In addition, developing applications for MCDs is complicated by the lack of a standard MCD operating platform. For example, to deliver a software solution to a majority of MCDs a developer would, at a minimum, have to create separate applications for WinCE-based devices, Palm, Inc.'s PALM OS®-based devices and Symbian Limited's EPOC®-based devices.

With respect to selecting and downloading useful applications, a MCD user typically would want to select applications and customize his/her MCD to manage tasks relevant to the user. Initially, downloading an application to a MCD was accomplished via a hardwire connection with a personal computer. The MCD user typically would preinstall an application before the application would be available. The installation process was performed by accessing a web site and downloading the specific application.

As an improvement to interfacing and communicating with other computing devices, later improvements in wireless technologies have allowed the MCD user the opportunity to download an application from a computer without the need for a hardwired connection. However, the burden is still on the MCD user to manually locate a computer capable of interacting with the MCD and to download the appropriate application.

The continuing emergence of wireless network access will lead to a dramatic rise in sales of mobile computing devices. However, the same limitations (battery life, processor speed, etc.) that prevent MCDs from using intensive applications also limit wireless network access. Most existing wireless network access is limited largely to wireless Internet web browsing.

Current attempts to increase the wireless capabilities of PDAs generally have focused on service discovery, a term used to describe the protocols and mechanisms by which a network connected device or software service becomes aware of the network to which it is connected and discovers which network services are available. For example, a PDA needs to discover the home network, and find a service that will provide PDA to PC synchronization capabilities and use that synchronization service.

Service discovery can be pre-configured. This is the solution that techniques such as DHCP, DNS and LDAP provide for enterprise networks. For a relatively static system with infrequent addition of new devices or software services, this may be a viable approach. However, in many instances, new information and services will be added and changed. Present service discovery mechanisms have largely ignored the difficulties of providing services to a multitude of heterogeneous mobile devices, many with their own native operating systems and hardware.

Protocols and technologies have been developed to address new and changing services. Three popular technologies are Bluetooth SIG, Inc.'s BLUETOOTH™, Sun Microsystems, Inc.'s JINI™, and Universal Plug and Play (UPnP). Sun Microsystems developed the JINI™ technology to address needs for networks of Java-enabled devices, using API's as the sole contract between vendors. BLUETOOTH™ is a consortium developing short-range wireless communication protocol, which allows BLUETOOTH™ devices to discover services offered by or through other BLUETOOTH™ devices. Universal Plug and Play (UPnP) is marketed as a language- and operating system-neutral platform. Users of UPnP are able to dynamically download applications to wireless devices regardless of the device vendor.

GLOSSARY

The following illustrative explanations are provided to facilitate understanding of certain terms used frequently herein, particularly in the Description of Illustrative Embodiments. The explanations are provided as a convenience and are not limitative of the invention.

ADSI (Active Directory Service Interfaces)—a set of interfaces that abstracts the capabilities of different directory services from different network vendors to present a single set of directory service interfaces for managing network resources. Administrators and developers can use ADSI to manage the resources in a directory service, regardless of which network environment contains the resource. Applications written to ADSI will work with any directory service that offers an ADSI provider.

API (Application Program Interface)—a set of routines, protocols, and tools for building software applications.

AutoIP—AutoIP is an enhancement to DHCP that allows devices to claim IP addresses in the absence of a DHCP server or similar IP configuration authority. IP addresses are claimed from a reserved range that is not allowed to be transmitted on the open Internet; thus they are only good for the local network. A device claims an address by randomly generating an address in the reserved range and then making an ARP request to see if anyone else has already claimed that address. AutoIP systems will continually check for the presence of a DHCP server so that if one should ever come online, all the AutoIP devices will attempt to switch their IP addresses to one provided by the DHCP server.

BLUETOOTH™—protocols for short-range radio technology aimed at simplifying communications among Net devices and between devices and the Internet. It also aims to simplify data synchronization between Net devices and other computers.

CORBA (Common Object Request Broker Architecture)—CORBA relies on a protocol called the Internet Inter-ORB Protocol (IIOP) for remoting objects. Everything in the CORBA architecture depends on an Object Request Broker (ORB). The ORB acts as a central Object Bus over which each CORBA object interacts transparently with other CORBA objects located either locally or remotely. Each CORBA server object has an interface and exposes a set of methods. To request a service, a CORBA client acquires an object reference to a CORBA server object. The client can now make method calls on the object reference as if the CORBA server object resided in the client's address space. The ORB is responsible for finding a CORBA object's implementation, preparing it to receive requests, communicate requests to it and carry the reply back to the client. A CORBA object interacts with the ORB either through the ORB interface or through an Object Adapter—either a Basic Object Adapter (BOA) or a Portable Object Adapter (POA). Since CORBA is just a specification, it can be used on diverse operating system platforms from mainframes to UNIX boxes to Windows machines to handheld devices as long as there is an ORB implementation for that platform. Major ORB vendors like Inprise have CORBA ORB implementations through their VisiBroker product for Windows, UNIX and mainframe platforms and Iona through their Orbix product.

DBMS (database management system)—collection of programs that enables you to store, modify, and extract information from a database. There are many different types of DBMSs, ranging from small systems that run on personal computers to huge systems that run on mainframes.

DCOM (Distributed Component Object Model)—an extension of the Component Object Model (COM) to support objects distributed across a network. DCOM was developed by Microsoft and has been submitted to the IETF as a draft standard. Since 1996, it has been part of Windows NT, and is also available for Windows 95. DCOM serves the same purpose as IBM's DSOM protocol, which is the most popular implementation of CORBA. Unlike CORBA, which runs on many operating systems, DCOM is currently implemented only for Windows. It supports remoting objects by running on a protocol called the Object Remote Procedure Call (ORPC). This ORPC layer is built on top of DCE's RPC and interacts with COM's run-time services. A DCOM server is a body of code that is capable of serving up objects of a particular type at runtime. Each DCOM server object can support multiple interfaces each representing a different behavior of the object. A DCOM client calls into the exposed methods of a DCOM server by acquiring a pointer to one of the server object's interfaces. The client object then starts calling the server object's exposed methods through the acquired interface pointer as if the server object resided in the client's address space. As specified by COM, a server object's memory layout conforms to the C++ vtable layout. Since the COM specification is at the binary level it allows DCOM server components to be written in diverse programming languages like C++, Java, Object Pascal (Delphi), Visual Basic and even COBOL. As long as a platform supports COM services, DCOM can be used on that platform. DCOM is now heavily used on the Windows platform. Companies like Software AG provide COM service implementations through their EntireX product for UNIX, Linux and mainframe platforms; Digital for the Open VMS platform and Microsoft for Windows and Solaris platforms.

DHCP—The Dynamic Host Configuration Protocol (DHCP) is a mechanism for providing devices with configuration information needed to access the Internet. The mechanism functions through the use of a multicast request for configuration information that is generally responded to with an IP address and DNS server location.

EJB (Enterprise Java Beans)—Java components that fit together in a standard way, and forms a software component architecture that enables creation, assembly and use of dynamic Java software components. A software component is a reusable software module that is supplied in a binary form. Interface to the component is at a binary level.

Central to Java Beans is a set of APIs called Beans APIs. Supporting the Beans APIs are a number of new Java features which include, without limitation, Reflections, Object Serialization, AWT Enhancements, Inner Classes, RMI, and IDL.

HTTP (HyperText Transfer Protocol)—the underlying protocol used by the World Wide Web. HTTP defines how messages are formatted and transmitted, and what actions Web servers and browsers should take in response to various commands.

IMAP (Internet Message Access Protocol)—a protocol for retrieving e-mail messages from a server to an e-mail client. The latest version, IMAP4, is similar to POP3 but supports some additional features.

JAR (Java Archive)—a platform-independent file format that aggregates many files into one. Multiple Java applets and their requisite components (.class files, images and sounds) can be bundled in a JAR file and subsequently downloaded to a browser in a single HTTP transaction, greatly improving the download speed. The JAR format also supports compression, which reduces the file size, further improving the download time. In addition, the applet author can digitally sign individual entries in a JAR file to authenticate their origin. It is fully backward-compatible with existing applet code and is fully extensible, being written in Java.

Java—an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Virtual Machines (VMs), exist for most operating systems, including UNIX, the Macintosh OS, and Windows. Bytecode can also be converted directly into machine language instructions by a just-in-time compiler (JIT). Java is a general purpose programming language with a number of features that make the language well suited for use on the World Wide Web. Small Java applications are called Java applets and can be downloaded from a Web server and run on your computer by a Java-compatible Web browser, such as Netscape Navigator or Microsoft Internet Explorer.

JDBC (Java Database Connectivity)—a Java API that enables Java programs to execute SQL statements. This allows Java programs to interact with any SQL-compliant database. Since nearly all relational database management systems (DBMSs) support SQL, and because Java itself runs on most platforms, JDBC makes it possible to write a single database application that can run on different platforms and interact with different DBMSs.

JINI™—software from Sun Microsystems that defines a set of protocols for discovery, join, and lookup, and provides a leasing and transaction mechanism. JINI™ seeks to simplify the connection and sharing of devices on a network.

JNI (Java Native Interface)—a Java programming interface, or API, that allows developers to access the languages of a host system and determine the way Java integrates with native code.

LDAP (Lightweight Directory Access Protocol)—a set of protocols for accessing information directories. LDAP is based on the standards contained within the X.500 standard, but is significantly simpler and supports TCP/IP.

OOP (Object Oriented Programming)—Object-oriented programming is based upon the object model where pieces of code called "objects" contain data (called "attributes") and may have actions (know as "operations") performed on it. An object is defined by its interface. The interface defines the characteristics and behavior of a kind of object, including the operations that can be performed on objects of that interface and the parameters to each operations. A specific instance of an object is identified within a distributed object system by a unique identifier called an object reference.

RMI (Remote Method Invocation)—a distributed object model, in which the methods of remote objects written in the Java programming language can be invoked from other Java virtual machines, possibly on different hosts.

RPC (Remote Procedure Call)—a type of protocol that allows a program on one computer to execute a program on a server computer. Using RPC, a system developer need not develop specific procedures for the server. The client program sends a message to the server with appropriate arguments and the server returns a message containing the results of the program executed SGML (Standard Generalized Markup Language)—a system for organizing and tagging elements of a document; SGML itself does not specify any particular formatting. Rather, it specifies the rules for tagging elements. These tags can then be interpreted to format elements in different ways.

SMTP (Simple Mail Transfer Protocol)—a protocol for sending e-mail messages between servers. Most e-mail systems that send mail over the Internet use SMTP to send messages from one server to another. In addition, SMTP is generally used to send messages from a mail client to a mail server.

SOAP (Simple Object Access Protocol)—a protocol that allows applications to communicate with each other over the Internet, independent of platform. SOAP relies on XML to define the format of the information and then adds the necessary HTTP headers to send it.

SQL (Structured Query Language)—a standardized query language for defining database objects and manipulating data.

SSDP (Simple Service Discovery Protocol)—a Web/XML standard for describing devices that provides a mechanism whereby network clients, with little or no static configuration, can discover network services. SSDP accomplishes this by providing for multicast discovery support as well as server based notification and discovery routing.

3G (Third Generation of wireless communication technology)—a set of standards for wireless data and voice communications with an intermediate goal of raising transmission speeds up to 2M bit/sec.

XML (eXtensible Markup Language)—a specification developed by the W3C, XML is a pared-down version of SGML, designed especially for Web documents. It allows designers to create their own customized tags, enabling the definition, transmission, validation, and interpretation of data between applications and between organizations.

UPnP (Universal Plug and Play)—an architecture for pervasive peer-to-peer network connectivity of PCs of all form factors, intelligent appliances, and wireless devices. UPnP is a distributed, open networking architecture that leverages TCP/IP and the Web to enable seamless proximity networking in addition to control and data transfer among networked devices in the home, office, and everywhere in between.

URL (Uniform Resource Locator)—a standard for writing a text reference to an arbitrary piece of data in the WWW. A URL looks like "protocol://host/localinfo" where protocol specifies a protocol to use to fetch the object (like HTTP or FTP), host specifies the Internet name of the host on which to find it, and localinfo is a string (often a file name) passed to the protocol handler on the remote host.

WAP (Wireless Application Protocol)—a secure specification that allows users to access information instantly via handheld wireless devices.

WML (Wireless Markup Language)—an XML language used to specify content and user interface for WAP devices.

wrapper—an object that encapsulates and delegates to another object to alter its interface or behavior in some way. Also referred to as an "envelope."

SUMMARY OF THE INVENTION

It is an object of the present invention to promote the rapid development and deployment of wireless proximity network applications.

It is a further object of the present invention to provide a wireless framework for the dynamic delivery of service applications to mobile computing devices that come within the proximity of an application server.

It is a further object of the present invention to enable legacy applications to be easily ported for use by said mobile computing devices.

It is a further object of the present invention to provide customized services to said mobile computing devices.

Systems consistent with the present invention provide a framework that allows for the dynamic addition and deletion of service applications from the memory of mobile computing devices as they move into and out of geographic zones. This service allows for the update, i.e., addition and deletion of available services automatically, without user intervention and without requiring the user to install additional software.

In accordance with methods consistent with the present invention, a method is provided for enabling legacy applications to be quickly made available for use with wireless mobile computing devices, with a minimal amount of porting required.

In accordance with one aspect of the present invention a system for dynamically delivering service applications to a user of a mobile computing device is provided. The system comprises a proximity networking server (PNS) having an associated proximity zone and a client application executable on a mobile computing device. The PNS comprises an access module for communicating wirelessly within the associated proximity zone, a registry of one or more service applications with each service application having one or more associated GUI components configured to be executable on a mobile computing device, and with the PNS configured to expose one or more of the service applications to mobile computing devices within the associated proximity zone. The client application is operable to establish a wireless connection between the PNS and the mobile computing device when the mobile computing device is located within the proximity zone, is configured to retrieve a list of exposed services from the PNS, and is configured to automatically download and execute the associated GUI component of an exposed service application in response to a request by the user to access the exposed service application, with the exposed service application being executed on the PNS, but is accessible to the user through the associated GUI component executing on the mobile computing device. In a narrower respect, the wireless connection utilizes the UPnP protocol. In another narrow respect, the associated GUI component allows the user to access functions of the exposed service application by using remote procedure calls sent from the client application to the PNS. In yet a narrower respect, the PNS further comprises a translation module for translating RPC's received from the client application into the appropriate format for use by the exposed service application and for translating results from the exposed service application into an output readable by the associated client GUI component. In another narrow respect, all downloaded GUI components are deleted from the mobile computing device when the mobile computing device leaves the associated proximity zone.

In accordance with another aspect of the present invention, a method for dynamically providing service applications to mobile computing devices in a proximity networking framework, the proximity networking framework comprising a PNS having an associated proximity zone, the PNS operable to establish a wireless data connection with a mobile computing device located within said associated proximity zone, is described. The method comprises the steps of registering a service application with the PNS (referred to hereinafter as registered service application), with the step of registering the service application further comprising the steps of registering an execution component of a service application with the PNS with the execution component operable to be executed by the PNS to provide the functionality of the service application, and registering at least one associated GUI of the registered service application with the PNS, with the GUI component configured to be executed by a mobile computing device to provide a user interface to the execution component, exposing the registered service application to the mobile computing device coming into the associated proximity zone (referred to hereinafter as the exposed service application), providing to the mobile computing device the UI component of the exposed service application, executing the execution component of the exposed service application on the server, and permitting the mobile computing device to utilize the executing exposed service application through the GUI component executing on the MCD. In a narrower respect, the method further comprises registering an associated access profile of the registered service application with the PNS, with the associated access profile used to determine whether the registered service application should be exposed to the mobile computing device. In another narrow respect, the method further comprises retrieving information about MCD or the user of the MCD (referred to hereinafter as retrieved information) and using the retrieved information to determine whether the registered service application should be exposed to the mobile computing device. In another narrow respect, the method further comprises retrieving information about the MCD or the user of the MCD (referred to hereinafter as retrieved information) and using the retrieved information to customize the exposed service application to the mobile computing device.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The present invention addresses the shortcomings of the prior art with a proximity networking framework that is operable to dynamically offer services to mobile computing devices with minimal pre-configuration.

The term "mobile computing device" is used broadly in the present invention to mean a microprocessor-based device operable to execute software instructions and to communicate with other microprocessor-based devices or a network through a wireless connection. Examples of such microprocessor-based devices include, without limitation, personal digital assistants (PDAs), personal computers (PCs), notebook computers, palmtop computers, network computers, network terminals, Internet appliances, wireless communication devices (e.g., mobile wireless phones), and game consoles. These devices may be operative to communicate with other computing devices wirelessly through any means of wireless communication, including without limitation, infrared, RF, BLUETOOTH™, 802.11, 3G, and cellular.

Overview of the Proximity Networking System

Methods and systems consistent with the present invention operate in a distributed system ("the exemplary system") with various components, including both hardware and software. The exemplary system (1) allows wireless users to dynamically access services and applications available in a given area; and (2) provides developers with tools to adapt applications and services for use by wireless mobile computing devices.

For purposes of the present disclosure, a "service" or "application" refers to a resource, data, software application or functionality that can be accessed by a user, program, device, or another service and that can be, without limitation, computational, storage-related, information-related, and/or communication-related. Examples of service include, but are not limited to: providing information, facilitating purchases and other financial transactions, implementing secured access mechanisms, and messaging.

Advantageously, at most, a user only has one piece of software to install on his or her MCD to access services. Further, the services offered to a MCD may be tailored or customized based upon data contained on MCDs such as, without limitation, user preferences, security preferences, profiles, and user identification. For developers, existing applications are more easily delivered to many heterogeneous mobile computing devices than developing new applications from scratch or porting whole applications to MCD platforms. In addition, by utilizing the exemplary system, developers are not limited by the limited computational power and storage resources of many MCDs. Still further, unlike traditional HTML-based systems the exemplary system provides for eventing, or server-driven communication.

Figure 1:
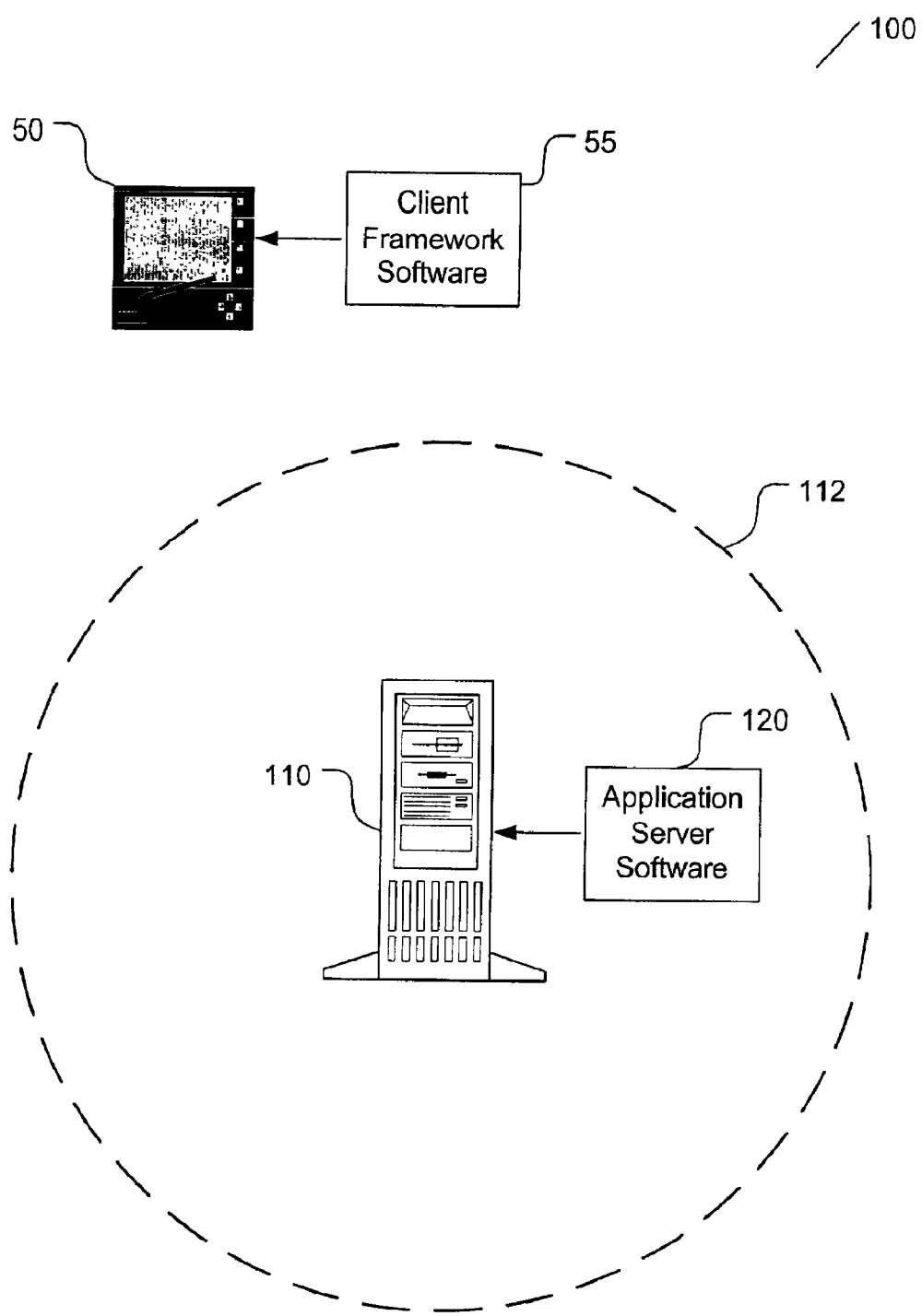
FIG. 1 is a high-level block diagram illustrating an exemplary system according to one embodiment of the present invention.

FIG. 1 is a high level depiction of the exemplary system 100. As shown, the exemplary system 100 includes a proximity network server 110 having an associated proximity zone 112, and proximity network client application 55 installed on client 50. Proximity network server 110 may utilize application server software 120 to make available some or all of its services to network clients within associated proximity zone 112.

Proximity zone 112 is the geographic area within which services are made available by proximity network server 110 to one or more clients. Though only one client 50 is depicted, in the exemplary system, services may be provided to a plurality of clients provided they are within proximity zone 112.

To access the services available within proximity zone 112, client application 55 must first be installed and running on client 50. In the exemplary system 100, client 50 is shown as a PDA. However, one skilled in the art would understand that the present invention contemplates the use of any mobile computing device and is not limited solely to PDAs. In some embodiments, client application 55 may be integrated into the client 50, for example, as part of the firmware, as part of the operating system, or as preloaded software. Advantageously, in these embodiments the user of client 50 would not have to install any software to access the services offered by PNS 110.

Figure 5:
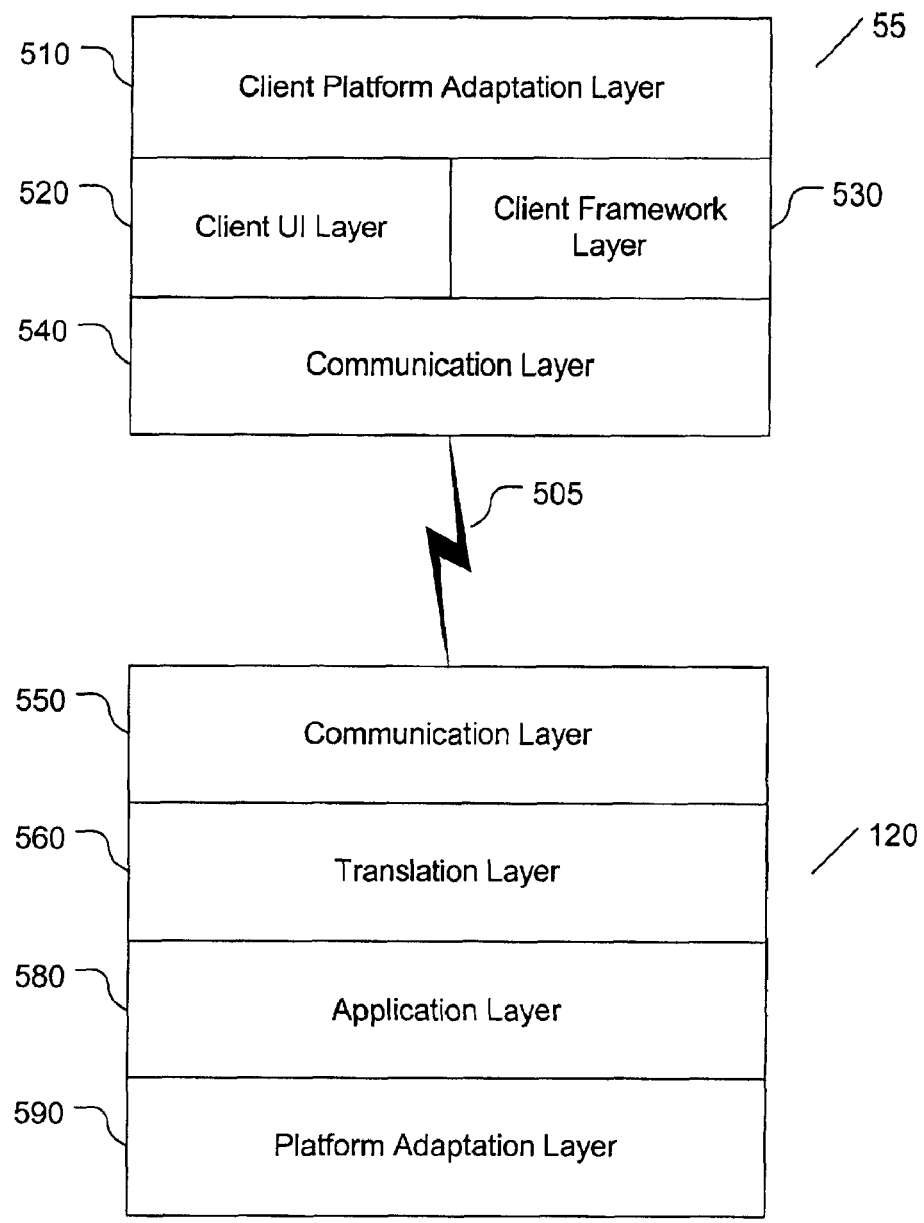
FIG. 5 is a block diagram depicting the software architecture of an exemplary system according to one embodiment of the present invention.
Figure 6:
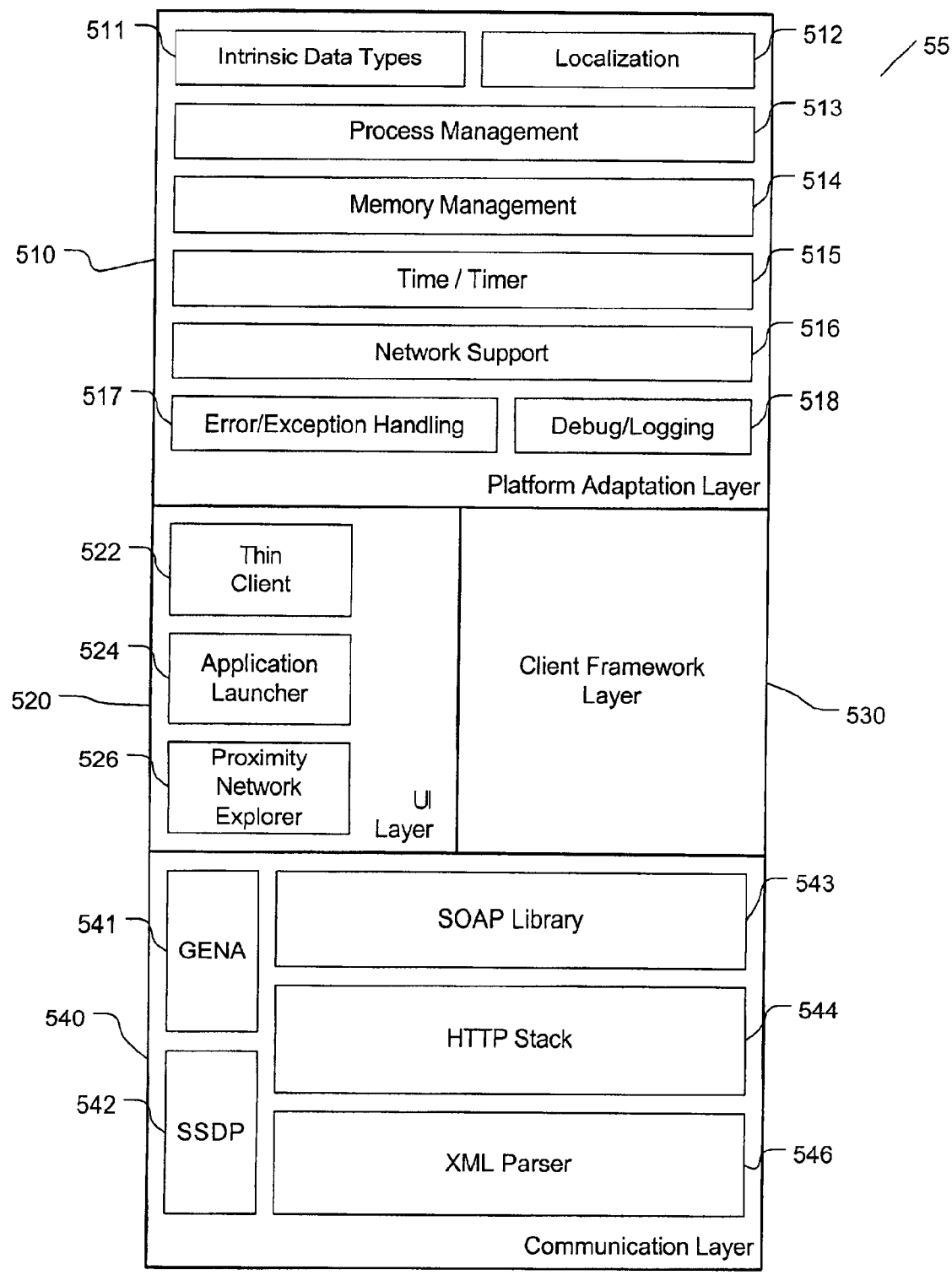
FIG. 6 is a block diagram detailing the client application from FIG. 5 according to one embodiment of the present invention.
Figure 7:
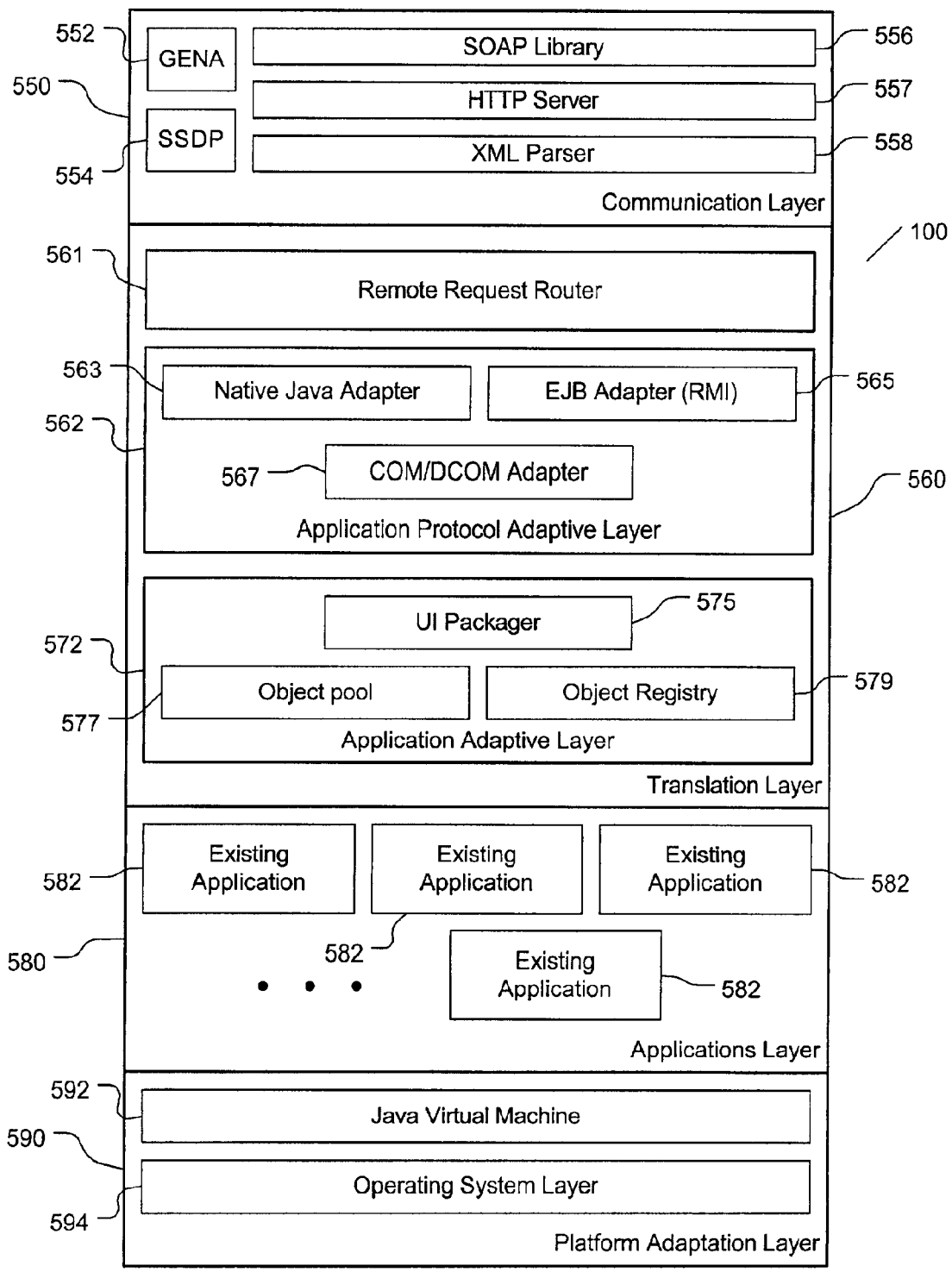
FIG. 7 is a block diagram detailing the application server software from FIG. 5 according to one embodiment of the present invention.

Proximity network server 110 is configured to perform two primary functions. First, it is operable to expose services to one or more clients within proximity zone 112. In addition, PNS 110 is operable to provide the underlying mechanism for executing some or all of an exposed service at the direction of a client. Advantageously, this reduces the computational and/or storage resources needed by the client and also permits services to be delivered to a variety of heterogeneous client platforms. Generally, this underlying mechanism is based on distributed object computing, wherein the client 50 invokes object methods on the server 110 from the client application 55. One particular sample implementation is depicted in FIGS. 5–7. It is noted, however, that many other configurations and variations utilizing distributed object computing techniques may be utilized in an implementation of the exemplary system without departing from the scope of the present invention.

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server model. With the client/server model, two major types of software are used: client application, which requests the information or service, and server software, which provides or implements the information or service.

Object-oriented computing is based upon the object model where pieces of code called "objects"—often abstracted from real objects in the real world—contain data and may have actions (also known as "operations") performed on them. An object is defined by its interface (or "class" in C++ parlance). The interface defines the characteristics and behavior of a kind of object, including the operations that can be performed on objects of that interface and the parameters to that operation. A specific instance of an object is identified within a distributed In a distributed object system, a client application sends a remote request (or "invocation," "object call," or "procedure call") to a server application containing an indication of the operation to be performed on a specific object, the parameters to that operation, the object reference for that object, and a mechanism to return error information (or "exception information") about the success or failure of a request. The server application receives the request and carries out the request via a server "implementation." The implementation satisfies the client's request for an operation on a specific object. The implementation includes one or more methods, which are the portions of code in the server application that actually do the work requested of the implementation. If the implementation is carried out successfully, the server application returns a response to the client, if necessary. The server application may also return exception information.

Referring back to FIG. 1, though PNS 110 is depicted as a stand-alone server, PNS 110 may also be connected to a LAN or other network connection such as a WAN, the Internet, intranet, or an extranet. Accordingly, one or more of the services offered through PNS 110 may originate through another client or server operable to communicate with PNS 110 through the network connection.

In some embodiments proximity network system 100 may incorporate multiple PNS servers 110, each with its own proximity zone 112. In addition, PNS 110, at times, will also act as a client to other Proximity Network Servers. A component of application server software 120 will route method invocations to the appropriate server where the target application resides.

Client application 55 is configured to perform three primary functions. First, it is operable to detect and offer the proximity services. The list of exposed services (also known as the registry) may contain an index of all applications available from the proximity server to which client 50 is connected. The registry may include the services resident on PNS 110 and for which PNS 110 is acting as a proxy.

In some embodiments, PNS 110 will send native executables to be run by client 50. The client application 55 may be configured to act as a class loader for any native executables to be run by the client 50. For example, in embodiments with PALM OS®-based clients, client application 55 will act as a class loader for PRC executables as all executables on the Palm are PRC files, regardless of the language of the executable, e.g., C/C++ or Java.

Finally, the client application generates the remote method invocation of the dynamically loaded services and transmits them to the proximity network server 110. One sample technique for generating such remote method invocations is discussed in conjunction with FIG. 6.

Although proximity network server 110 is shown in FIG. 1 as being located within proximity zone 112, it is not required to be located within. In addition, although proximity zone 112 is depicted in FIG. 1 as being circular, it is understood that proximity zone 112 can generally take on any shape or configuration.

Figure 2:
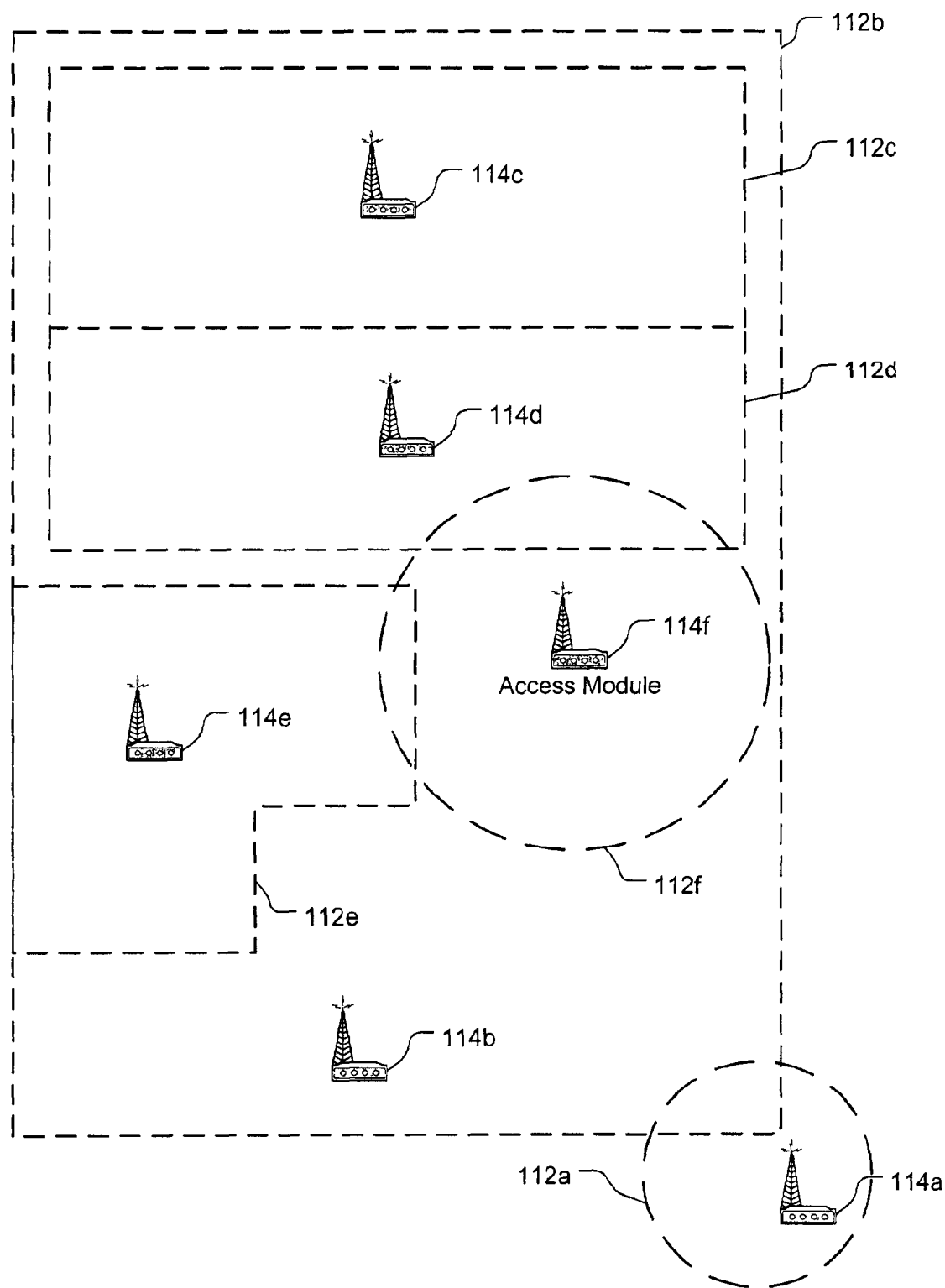
FIG. 2 is a conceptual depiction of proximity zones according to one embodiment of the present invention.

As shown in FIG. 2, proximity zones may overlap and can take on almost any conceivable shape or configuration. Proximity zones may partially overlap, such as between zones 112a and 112b, zones 112e and 112f, and zones 112d and 112f. In addition, proximity zones may fully overlap such as with zone 112b and zones 112c, 112d, 112e and 112f. Zones may be adjacent, such as with zones 112c and 112d.

The size and shape of proximity zone 112 is a design decision affected by many factors including, the wireless transmission mechanism(s) that are used, and desired geographic coverage. In some embodiments, the proximity zone may extend radially from one or more wireless transceivers operatively coupled to a proximity network server 110. In other embodiments, the proximity zone may extend throughout a fixed geographic area such as a floor or part of a floor (e.g., an office) in an office building.

As shown, the wireless transmission mechanism for each proximity zone 112 may be an access module 114, which is operably coupled PNS 110. As used in this disclosure, "operatively coupled" means connected in such a way that data may be exchanged. It is understood that "operatively coupled" does not require a direct connection, a wired connection, or even a permanent connection. It is sufficient for purposes of the present invention that the connection(s) be established for the sole purpose of exchanging information. Examples of access modules include, without limitation, wireless transceivers, 802.11 base stations, wireless bridges, RF sensors, and IR sensors. The particular type of access module utilized an any given implementation of the exemplary system is a design decision based upon many factors including, but not limited to, size of the proximity zone and the desired transmission protocol. The present invention is not limited to any particular implementation.

For example, in one embodiment, a high-rise office building may have an exemplary system installed. General building-related services may be offered through a building-wide proximity zone. Further, each floor may have specific services available to clients on that floor. Still further, on floors with multiple businesses sharing the floor, each business may have its own proximity zone with its own set of available services. Still further, each business office may be further subdivided to smaller sub-zones including, without limitation, offices, break rooms, and departments.

Proximity zones are limited only by the power and reach of the transmission mechanisms. In some embodiments, proximity zones may be as large as cities, states, or even countries. While in other embodiments, the proximity zone may be only very limited.

Figure 3:
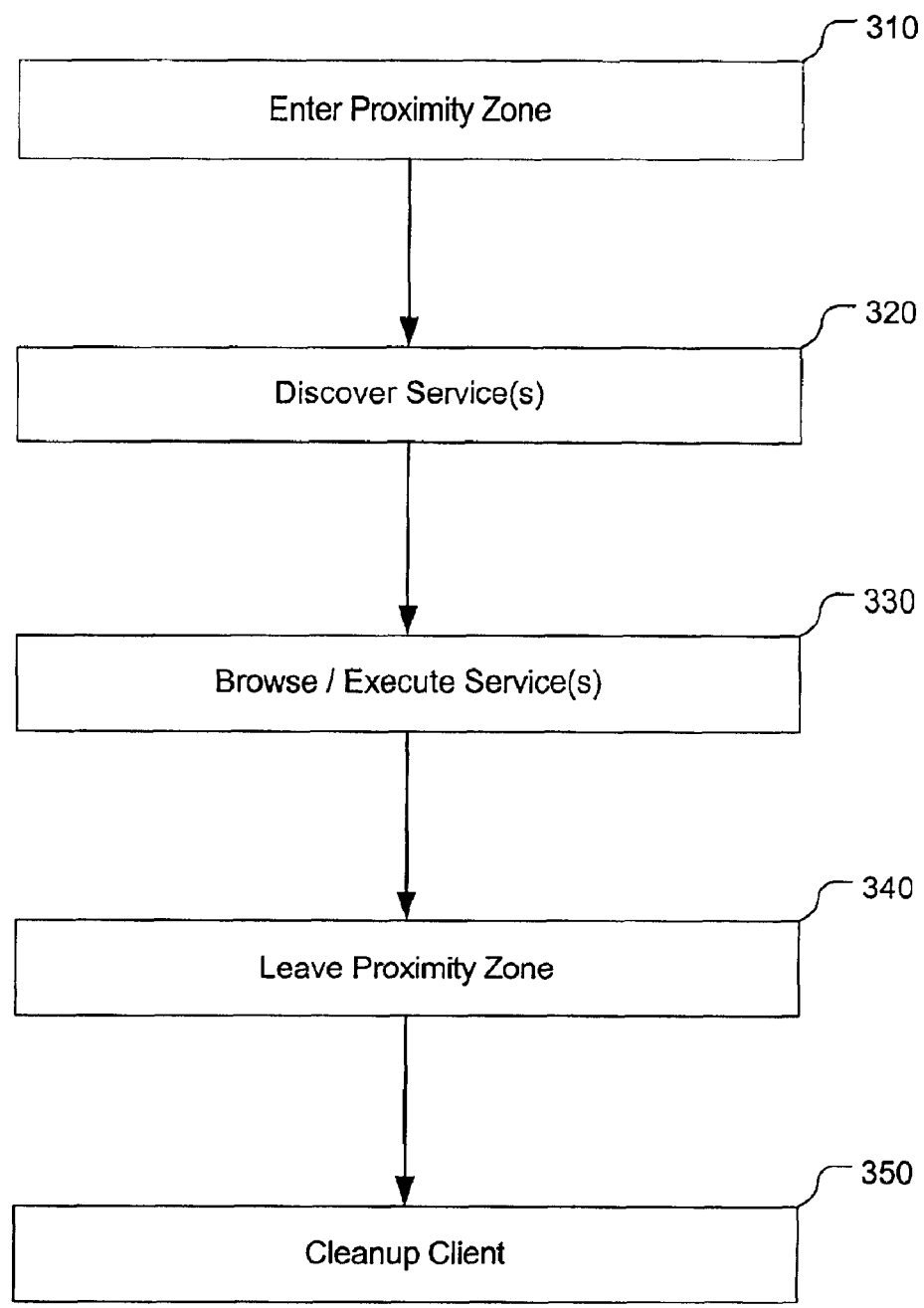
FIG. 3 is a flow chart depicting the operation of an exemplary system.

FIG. 3 depicts the general operation of the exemplary system 100 depicted in FIG. 1. As a client, enters a proximity zone 310, the client establishes communications with PNS 110 and discovers 320 the services that are made available (also referred to as "exposed services").

Figure 4:
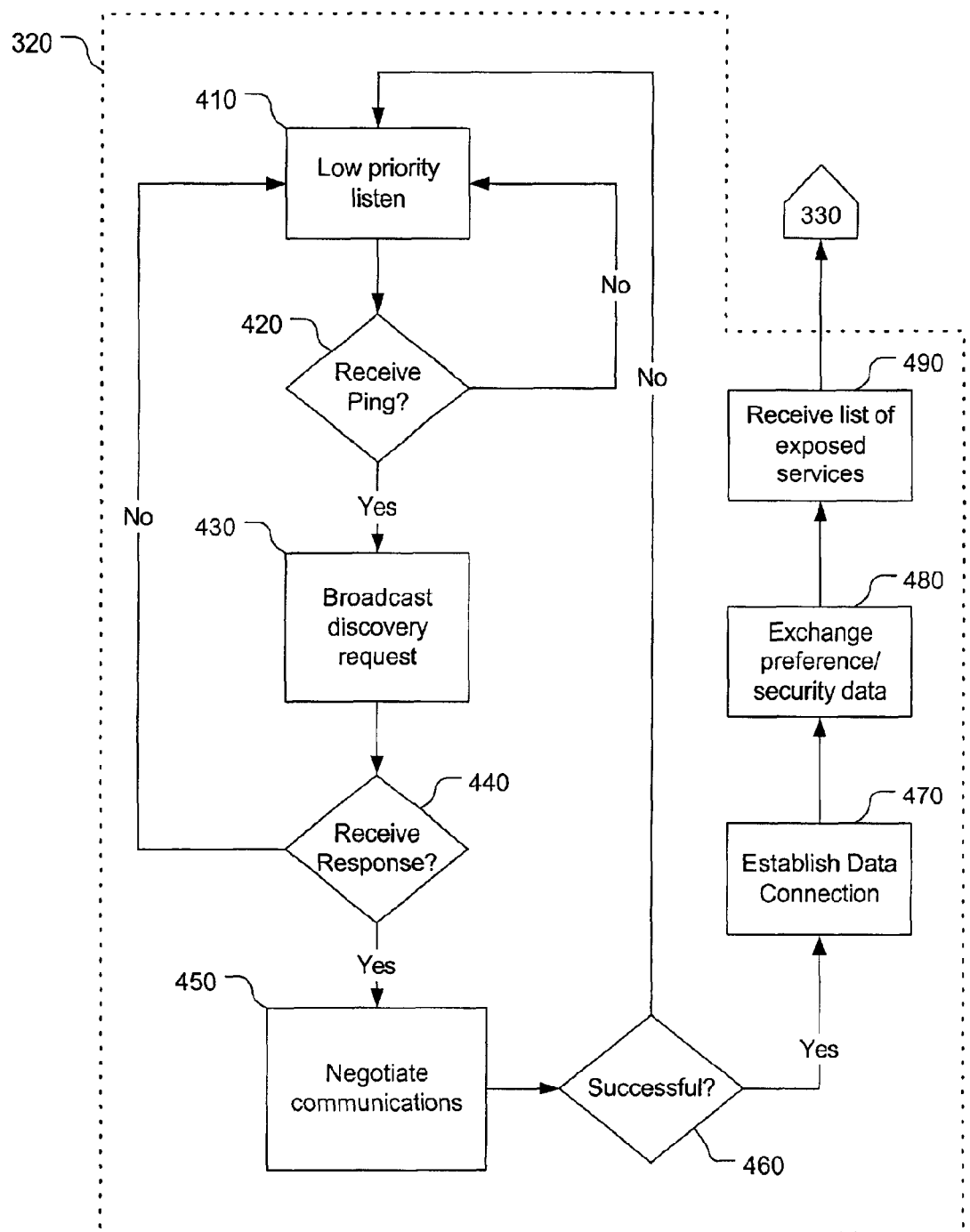
FIG. 4 is a flow chart detailing the service discovery operation as shown in FIG. 3 according to one embodiment of the present invention

FIG. 4 illustrates the service discovery step 320 in more detail, according to one particular embodiment of the exemplary system. As shown, client 50 generally stays in a low priority listen mode 410 to save power and processing time. In mode 410, the client 50 only needs to devote a few computational resources to detect a prespecified triggering event. This triggering event or "ping" is sent out (periodically or continuously) by proximity network servers and is receivable by the client 50 throughout the PNS's associated proximity zone. When client 50 receives a ping 420, the client exits the low priority listen mode 410 to verify that the client 50 is actually within a proximity zone. To do so, client 50 broadcasts a discovery request 430 to all proximity network servers that receive the discovery request 430 to establish communications with client 50. The discovery request 430 may typically include data about the triggering event, which may be used by a proximity network server receiving the discovery request 430 to determine whether to respond.

If a proximity network server responds 440 affirmatively to the discovery request 430, the client 50 and PNS will negotiate communication parameters 450. Here, the parameters defining the data communication mechanism are determined. Parameters may include, without limitation, transmission protocols to be used, transmission rate, whether error-checking is to be used, and the network addresses of both client 50 and PNS 110. Any transmission protocol available to both the client and PNS may be used without departing from the scope of the invention. Examples include, without limitation UPnP, JINI™ and of Jabber.com, Inc's JABBER® technology.

In addition, in some embodiments, the client 50 and PNS may negotiate to utilize one or more transmission security mechanism or protocol may be utilized. In one particular embodiment, the transmission security mechanism may be based upon a digital certificate that is stored on client 50 and is accessible by client application 55. Similar, in some embodiments, the client 50 and PNS may negotiate 450 to use any compression scheme that both sides agree upon during the negotiation 450.

If the communication parameters and protocols are successfully negotiated 460, a data connection 470 may be established and client 50 may receive a list of services exposed by PNS 110.

In some embodiments, before the exposed services registry is received by the client, the client may provide the PNS with information 480 such as data about its capabilities, preferences of the user, personal information of the user, the identity of the user or client (e.g., by providing a copy of a digital certificate), and/or security attributes of the user or client. This data may be used by the PNS in determining which service(s) from its registry to expose to client 50. In some embodiments, this information may be used in the actual provision of services.

In some embodiments, not depicted, PNS 110 can access data stored on client 50. This information may have originated from PNS 110 or from any other source such as a web browser or personal computer. For example, a user may use his or her MCD to connect to a web site and electronically buy a ticket to an event. A digital copy of the ticket may be stored on the MCD. A PNS at the venue for the event may be operable to retrieve the ticket information on the MCD and determine whether to permit entry and the services associated with entry into the venue.

In another embodiment, the list of exposed services 490 provided by the PNS comprises a service application stub for each exposed service. A "stub" is code and data that facilitates access to a remote function or service. Client application 55 can use the stub to access the service, and provide the description the service to the user.

Referring back to FIG. 3, client application 55 allows the user to browse the exposed services and execute one or more of the exposed service applications 330. In one example, an icon may be displayed on client 50 for each exposed service. The user could then click on each icon to get more detailed information about the service. If the user desires, he or she may then choose to utilize (or execute) a service application 330.

In some embodiments, after the data connection is established 470, MCDs with multitasking capability may reenter low priority listen mode 410. Advantageously, this allows the user to browse and execute one the exposed services 330 while simultaneously listening for new services. This functionality may be of particular interest in areas with overlapping proximity zones.

If the user chooses to utilize one or more of the exposed services 330, the appropriate and necessary software application is automatically transferred from PNS 110 and installed on client 50 by client application 55. Then, the user can use the service. As discussed below in conjunction with FIGS. 5 and 6, the software application that is transferred to the client application 55 is usually (but is not required to be) the user interface portion of the service. Advantageously, the more storage-intensive and computational-intensive portions remain on and are executed by the PNS, allowing the client 50 to be relatively thin.

Alternatively, the entire service application may be transferred from PNS 110 and installed on client 50 during step 490.

As PDA 50 leaves 340 the proximity zone 112, client 50 is cleaned up 350. In particular, the services made available to client 50 are removed as well as any stubs, and software applications or portions thereof downloaded from the proximity network server. Advantageously, the usually limited storage capacity of client 50 does not become cluttered and full as the user enters several proximity zones. Further, if it is not already in a low priority listen mode 410 client 50 may reenter a low priority listen mode 410 to be ready to detect new services.

Many mechanisms may be employed for client 50 to determine that is has left proximity zone 112 and all are within the purview of one skilled in the art. For example, in one particular embodiment, after client 50 has established its connection with PNS 470, client 50 will periodically poll the PNS, which establishes a lease for a predetermined amount of time (which preferably exceeds the polling period). If the lease is not renewed by a subsequent successful poll of the PNS, the lease expires and the connection is terminated.

Optionally, a user may specify that specific applications, such as commonly-used or critical, applications be cached (retained) on the client rather than be deleted. This may be more common as MCD's are given increasing storage capacity. Advantageously, this practice may reduce loading times associated with the transfer and installation of the necessary portions of an exposed service to client prior to execution. The benefits of this practice may be diminished as wireless transmission bandwidth increases.

Proximity Network Architecture

FIG. 5 depicts the general framework of the exemplary system including client application 55 and application server software 120. In the figure shown, a wireless data connection 505 has already been established. However, the presence of data connection 505 does not alter the configuration of either client application 55 or application server software 120.

The client platform adaptation layer 510 contains the necessary mechanisms to allow client application 55 to run on the software and hardware platforms of an MCD. Client UI layer 520 and client framework layer 530 run on top of platform adaptation layer 510 to provide the user interface and distributed object functionality, respectively. In particular, client UI layer 520 and client framework layer 530, provides the interface for the user of client 50 to retrieve, browse and utilize to the available exposed services provided through PNS 110.

Client communication layer 540 is configured to transmit data, including remote procedure calls, to PNS 110 and receive data, including application stubs and responses (including exception information) to remote procedure calls from PNS 110. As mentioned above, communication layer may include one or components for encryption, security, compression, or optimization of transmissions. Particularly with narrow-band wireless connections, compression and/or optimization may be desirable.

Similarly, the PNS communication layer 550 is configured to receive data from client 50 and transform it into a format understandable by the translation, execution, and application layers of application server software 120. It is also configured to transform and/or transmit data received from the other layers of application server software 120 to client 50. Like client communication layer 530, PNS communication layer 540 may also include one or more components for encryption, security, compression, or optimization of transmissions.

In some embodiments, both the client communication layer 540 and PNS communication layer 550 may utilize one or more protocols designed for optimal or efficient wireless communications and networking. Examples include UPnP, JINI™ and JABBER®. In addition, both the client communication layer 540 and PNS communication layer 550 may utilize one or more service discovery protocols to facilitate the service discovery step 320. Examples of service discovery protocols, includes without limitation, SSDP, LDAP and ADSI.

PNS translation layer 550 is configured to take object procedure calls made by client 50, to route them to the appropriate target object, being instantiated on PNS 110 or onto another server operably coupled to PNS 110. In addition, the translation layer 540 translates the remote object calls received from the client application 55 into an appropriate format for the target object. Similarly, the translation layer 540 formats the response from the target object into an appropriate format for the client application 55. Further, translation layer 550 may also determine which services are made available to client application 55.

PNS application layer 580 may contain services offered by PNS 110 and vectors for which PNS 110 is acting as a proxy. (e.g., a web server or another PNS server).

Communication layer 550, translation layer 560, and application layer 580 are all based on PNS platform adaptation layer 590. PNS platform adaptation layer 590 plays a role similar to that played by client platform adaptation layer 510—it allows the application server software to interact with the specific hardware and software (operating system) underlying PNS 110.

Each service in (or linked to through) application layer 580 contains at least two components: an execution component to be executed by PNS 110 in translation layer 560, and a remote component to be sent to client 50. In most cases, the remote component is primarily a UI component tied to the functionality of the execution component. The UI component is executed by client UI layer 520, permitting the user to access the functionality of the execution component which is actually running on the PNS 110.

Some service may have more than one associated remote components. Advantageously, this permits remote components to be tailored to the capabilities of particular MCDs. For example, a service may have remote components in the format of a platform-specific executable for the Palm OS, a platform-specific executable for the WinCE platform, and a platform-independent component written in WML. Advantageously, the execution component remains the same. Since the remote components take less time and resources to develop than execution components, developers can make the underlying service available through the several wireless platforms more easily than developing or porting multiple platform-specific software applications for each service. Thus, the present invention enables existing software applications to be easily configured for use in the dynamic proximity framework. Rather than rewriting the entire software program, developers merely need to create a GUI that is executable on a portable computing device, i.e., configured to interface with the actual software application running on a proximity network server.

Translation layer 550 may use any information about or relating to client 50 and/or its user to determine which remote components may be used by client 50. More particularly, when a service is requested for the first time, the client application 55 (specifically initiated by UI layer 510) will request the service object from PNS server 110. The PNS server framework 530 will determine the appropriate form of the remote object to send based upon the capabilities of the client 55. In one embodiment, the default GUI may be a WML interface. In others, it may be a native executable (e.g., a PRC file) for Palm, WinCE, Epic, and Microsoft Corporation's WIN32® application programming interface. In others it may be a Java Spotlet packaged in platform specific formats (e.g., by a dynamic spotlet packager in the PNS server framework 530).

FIGS. 6 and 7 provide a more detailed look at components of client application 55 and application server software 120, according to one exemplary implementation of the present invention.

Client and PNS Communication Layers

The embodiments shown in FIGS. 6 and 7 utilize a UPnP engine for wireless transmissions and to assist with service discovery. The UPnP engine is utilized by both the client application 55 and the proximity network server 110. UPnP is built upon SOAP which is built upon XML. In some embodiments, to keep the transfer of data small and efficient, an optional XML tokenizer may be added to compress the data prior to transmission. The UPnP engine may be written in ANSI C++ and compiled for both the client and server. The client will have a native-executable layer exposed to the client application and the server will use Java to expose the UPnP engine to the Proximity Network Sever. Optionally, the Java Native Interface may be used instead of Java.

The configurations of both the client communication layer 540 and PNS communication layer 550 are that of a standard UPnP engine. XML parsers (546 and 558) are used extensively in UPnP. All description and control data is communicated by XML documents in UPnP, so the XML parser is used by both the core UPnP protocols and by the client or service software. In one particular embodiment, the Xerces XML parser is used.

The HTTP stack 544 accepts all HTTP requests for SSDP, SOAP, GENA, and the Mini Web server over TCP and UDP connections. It will parse all HTTP headers and hand the connection over to the appropriate module for processing.

The HTTP server 557 handles standard HTTP GET requests, allowing XML description, presentation, and control documents to be served from the PNS. This module manages the locations of documents that are available and implements the actual streaming of the data via the HTTP protocol.

The SSDP (542 and 554) implements the discovery phase of UPnP, allowing search requests to be multicast for devices or services and receive the response from those searches. Likewise, SSDP (542 and 554) enables devices to advertise their existence and services to clients when they are connected.

One skilled in the art will appreciate that other service discovery mechanisms and protocols may be utilized as a replacement or in conjunction with SSDP. Examples include, LDAP and ADSI, both commonly found in enterprise level systems.

The General Event Notification Architecture or "GENA" (541 and 552) implements the eventing phase of UPnP. Control points use this module to subscribe or unsubscribe to events from device services. Devices receive subscribe and unsubscribe requests from control points via this module and generate appropriate event notifications.

The SOAP libraries (543 and 556) provide the control phase of UPnP. Clients use this module to general appropriate XML documents to retrieve or change the state tables of device services. Devices use this module to decode the control requests and generate the correct response.

Memory pool 545 provides the memory management services that will be unique for each MCD platform.

A tokenizer (not shown) may be used in conjunction with all UPnP messages that are transferred to makes the data smaller and more efficient. The tokenizer layer encodes and decodes UPnP messages to the XML layer which passes the data to the SOAP layer which in turn passes it to the UPnP engine where the appropriate action is then executed. This engine will provide the Client Launcher Application with a registry list from which the class loader will determine which PRC files to load when the user requests it.

Advantageously, the presence of communication layers 540 and 550 makes it possible for the other layers of client application 55 and application server software 120 to operate without having to directly interpret the SSDP, GENA, and SOAP.

Client and PNS Platform Adaptive Layers

As mentioned above, the platform adaptive layers are used to allow the respective software application to interface with the underlying hardware and software (operating system/platform) of the client and the PNS.

The intrinsic data types component 511 accounts for variations in intrinsic data types among different platforms. For example, some platforms do not have a "STRING" data type. Here, intrinsic data types component 511 may simulate a STRING data type utilizing an array of available CHARACTER data types.

Localization component 512 may account for variations in text messages based upon geographic location by providing multi-language support.

Similarly, process management component 513, memory management component 514, time/timer component 515, network support component 516, error/exception handling component 517, and debug/logging component 518 all account for platform-and operating system-specific variations and nuances in the enumerated area.

In the illustrated implementation, PNS is based upon the Java Platform. Accordingly, the combination of Java Virtual Machine 592 and operating system layer 594 performs the same functionality as client platform adaptation layer 510.

Client UI Layer

Through thin client 522, the user has control over many aspects of the proximity network services that he or she wishes to be a part of. For example, the user may be able to set service preferences, program options, identification information, security levels, length of the lease for time-out purposes, and/or whether he or she wants to use secure transmissions.

Proximity network explorer 526 exposes a master list or "registry" of services available to the user and allows the user to search for and browse available services. Each service may be a PRC (Palm-native executable) that is launched from the proximity application launcher. Native C-based PRC files will need to implement the API to communicate with the UPnP engine. Java-based PRC files will need to be implement a JNI wrapper API to the UPnP engine. WML/WAP data will be viewed by a WML browser (which will be a native C PRC). In one embodiment, the proximity network explorer 526 functions as a desktop with icons depicting each of the available exposed services. In embodiments utilizing service stubs, proximity network explorer 526 would present the user with a brief description of the service in addition to the icon.

If the user selects a service to execute, and if the UI component of that service has not already been transferred to and installed on client 50, application launcher 524 will request that the PNS 110 send the UI component to client 50. Application launcher 524 will then execute the UI component, graphically depicting the operation of the service. In the case of native executables such as PRC files, client 50 will need to implement proprietary interfaces (or APIs) to communicate back through the UPnP engine. In particular, with native C/C++ PRCs, the developer may simply implement the native C/C++ APIs. In the case of Java there may be Java APIs, which are JNI wrappers around the C/C++ APIs. Advantageously, the developer will never need to touch the UPnP layer or have to understand the protocol. All remote method invocations will be handled "under the hood."

As described above, though the service is depicted on client 50, the service is actually being implemented on PNS 110. Application launcher 524 will take any user requests and (through client framework layer 530) generate RPC that are sent to PNS 110. Application launcher 524 will also display (with the assistance of client framework layer 530) responses from PNS 110.

Client Framework Layer

Client framework layer 530 performs the majority of the functionality of client application 55. For example, it generates the actual RPCs from a user request through application launcher 524, and sends it to PNS 110 through communication layer 540. It also receives the responses from PNS 110 and sends them in the proper format to application launcher 524 for display. Client framework layer 530 is also responsive to requests for data from PNS 110.

PNS Applications Layer

Applications layer 580 may contain one or more existing applications (or services) 582. In some instances, these may be legacy non-wireless applications. In other cases, the application may not be contained within PNS 110. For example, applications layer 580 may contain a vector to an existing application running on another server, such as a web server or another proximity network server operatively coupled to PNS 110, for which PNS 110 is acting as a proxy. In some embodiments (not shown) one proximity network server may act as a client to other proximity networks servers.

The applications in the application layer 582 may be Java applications in the JAR format. The applications may need to implement our proprietary interfaces but should otherwise function as any Java object. As such they can be written to perform any function that Java can currently perform. Such abilities include interaction with Enterprise Java Beans (EJB), Email functionality via SMTP and IMAP, database interaction with JDBC, and a Java-to-COM bridge. Advantageously, by using the Java applications, legacy services can be integrated within the infrastructure of the present invention and ported to a mobile computing device with a thin-client user interface (e.g., a Palm).

PNS Translation Layer

Requests (such as RPCs and requests for UI components) generated by client 50, will arrive to the PNS translation layer after going through both the client and PNS communication layer. Remote request 561 is generally configured to determine where the intended recipient of the request is located and route the request there.

With respect to RPC requests, remote request 561 will take the RPC, remove any extraneous information added by the communication layer and direct the RPC to its intended target. In one particular embodiment, the RPC arrives to the remote request router 561 encapsulated in a SOAP envelope. In this embodiment, the remote request router 561 would remove the SOAP envelope before directing the RPC to its target.

To direct the RPC to its target, remote request router 561 would reference object registry 579. Object registry 579 may contain a listing of all accessible objects that are either available on PNS 110 or available on another server for which PNS 110 is acting as a proxy; a categorization and classification of the object; a unique identifier for each object (called a "uuid") such that if multiple instances on an object exist in the registry, there will be a unique uuid for each instance; physical location of the object, and its preferred protocol for access; and various attributes about the object as appropriate to the application. Sample attributes may include, without limitation, icons, version number, description, and vendor name.

Also, during the service discovery step 320 discussed above in conjunction with FIG. 3, object registry 579 is configured to determine which of the services in applications layer 580 to serve up to client 50. As discussed above, object registry 579 may use any data collected from or about client 50 and/or the user of client 50 in making this determination. In some embodiments, the services may have predetermined permissions associated with them which may be mapped to a directory service. In these embodiments, the object registry 579 may determine which services to serve up to the client by use of the mapping structure. In one specific embodiment, when the service discovery search request is sent from the client 50, remote request router 561 will convert that into a 'query' of object registry 579. The query as interpreted by object registry 579 will give a result set of services that meet the query criteria.

Before the RPC is delivered to the target object, the RPC goes through application protocol adaptive layer 562. Protocol adaptive layer contains one or more protocol adapters such as native Java adapter 563, EJB adapter (RMI) 565, and COM/DCOM Adapter 567. Though specific adapter types are depicted, one skilled in the art will appreciate that the exemplary system is not limited to any particular protocol adapters. Application protocol adaptive layer 562 uses the protocol adapter that corresponds to the protocol of the RPC's target object to properly format the RPC.

If a service is offered on PNS 110, the associated objects would be found in object pool 577. Object pool 577 is an object repository used by programs within the exemplary system 100 to store objects. Programs use the application object pool to store objects persistently as well as to make them accessible to other devices within the exemplary system.

In embodiments utilizing a LDAP registry service, the LDAP registry may also serve as object pool 577. With LDAP, the underlying directory service can store binary data, which could be used to store the object itself. In these embodiments, the LDAP registry service may be physically located on a separate server operably coupled to PNS 110.

After the RPC reaches the target object, the response goes back through application protocol adaptive layer 560 and remote request router 561, where it's sent back to the appropriate client through the respective communication layers.

The server application will expose a list to the client application launcher using the UPnP protocol. The UPnP engine will be used to translate and compress UPnP information to and from the server. The server will then translate UPnP calls to java method calls. Thus, with a similar technology (RMI) the process of remote communication will be mostly removed from the programmer's responsibility. Applications can then be written to communicate with other existing technologies or applications just as a Java program would.

UI Packager

When client 50 requests a UI component for a service, UI Packager 575 is configured to select the appropriate associated UI component and transfer it to client 50. As mentioned above, PNS 110 may obtain information about the capabilities of client 50 and use that data to choose the UI component that would run the best on the particular client 50.

Although systems and methods consistent with the present invention are described as operating in the exemplary system in specific programming environments and utilizing specific protocols and standards, one skilled in the art will appreciate that the present can be practiced in other systems, other programming environments, and other protocols and standards. Additionally, although aspects of the present invention are described as being stored in memory, one skilled in the art will appreciate that these aspects can also be stored on or read from other types of computer-readable media, such as secondary storage devices, like hard disks, floppy disks, or other forms of RAM or ROM.

Operation of An Illustrative Embodiment

The following contains a description of the operation of one particular exemplary system. In this example, the user has a mobile computing device enabled with the PNS client application. When a user brings the MCD into the proximity zone of a proximity network server, the mobile computing device detects a ping from a proximity network server, a hardware interrupt signal is sent to the client application. The interrupt signal causes the client application to send out a discovery request known as an M-SEARCH request. The discovery request uses SSDP as required in the UPnP specification. The proximity network server returns a message to the client including a brief description of the service and the icon to be placed in the browser. The UPnP specification defines this process as DESCRIPTION. The MCD user now has the option to use any service that has been discovered.

When the user clicks a service icon, the client application makes an HTTP request to the service's application description document. An application description document is a standardized XML formatted document as defined by the UPnP specification. This document contains a detailed set of information about the service and most importantly, information necessary for the browser to locate the client interface to the application. The client application also makes an HTTP request for the client interface. The PNS UI packager determines the optimal client interface for the requesting hardware and returns the information in one of any number of formats including but not limited to WML, Java spotlet, or a native application (e.g., a .exe or .prc file). The PNS UI packager then sends the client interface to the browser using a standard HTTP response. Once the browser receives the client interface, the browser then loads the client interface into the memory of the client hardware (in this case the PDA).

When the user invokes a method or function on the client application, the underlying transport libraries package the information into a SOAP envelope (or message) and sends the message to the proximity network server. The proximity network server processes the message and invokes the proper remote method on the server's side and returns the response or error in SOAP format.

When the proximity network server receives a request, the server proceeds through a series of steps that are not exposed to the end user or developer. The application server compares the request with a registry of mapped services/methods. If the requested method exists then the remote request router invokes the method (on the client's behalf) on one of the applications in the object pool. Applications are stored in the object pool through a registration process that occurs when the developer decides to wirelessly enable his application. The registration process also creates the method mappings in the applications registry.

If the method to be invoked is on a standard Java application or Java bean, the RPC is made using Java's introspection technique adapter. If the application is an Enterprise Java Bean, a COM/DCOM exposed object or a CORBA enabled Unix application, the RPC proceeds through the protocol adaptive layer using one of the protocol adapters. The resulting data from the RPC is then translated back into a SOAP message and routed back to the client.

Vertical Applications

The systems and methods consistent with the present invention may be deployed in several varied applications and types of applications. Examples include but are not limited to: facilitating retail transactions, providing information at and about a variety of locations (including e.g., movie theaters, airports, government offices, taxi stands, bus stops, and private offices), instant messaging within a proximity zone, and facilitating a myriad of other services (such as ordering goods and services, reporting incidents, and utilizing equipment).

Airports

A mobile computing device (MCD) user enters a proximity zone in an airport and his/her wireless MCD broadcasts a service discovery request which is detected by a proximity network access module. The proximity network server establishes communications with the user's MCD and determines the user's identity and profile information. At this point, the PNS sends a list of exposed services applications to the user's MCD. In an airport setting, these applications may include flight check-in, gate/departure information, seating assignment/plane configuration, etc. The user's MCD presents these applications as icons within a browser area. Customer can then begin selecting icons/applications allowing them to check-in, change their seat assignment, and make sure their travel award account number has been credited.

Events

A user may purchase tickets to a baseball game or other event via the Internet and e-ticket confirmation is downloaded to the user's MCD. On game day, the user arrives at the baseball stadium and upon entering the gate area the user's MCD detects a ping from a proximity network server in the stadium. The MCD transmits a service discovery request and communications are established between the user's MCD and the PNS. The PNS verifies the user ID and e-ticket information allowing the user entrance to the stadium. As the user enters the ballpark area, information icons regarding seating, ballpark layout (including bathrooms and vending), and team line-ups may be transmitted to the user's MCD. During the seventh inning stretch, the user's MCD receives a special promotion icon promoting coupons/incentives from team sponsors. In addition, the user may have instant replay services on his/her MCD allowing the user to watch an instant replay video of some or all parts of the event. In some instances, before leaving the ballpark the user (using the MCD) may be able to purchase tickets to attend an upcoming game/event.

Retail

Before traveling to a grocery store, a MCD user downloads information (e.g., coupons/specials) for the neighborhood grocery store from their home network to their MCD. Upon entering the store, the MCD is in the proximity zone of a proximity network server. Alternatively, coupons and specials can be dynamically loaded to the MCD at the store utilizing the store's proximity network. After the MCD transmits a service discovery request, the MCD and the PNS establish communications, and the PNS determines the customer's identity and profile information, including shopping preferences. The PNS sends information on in-store specials to client device. All applications are presented on client device as icons within a browser area From the browser area, the user can select an application by clicking on an icon, allowing them to see list of in-store specials, etc. As the user moves through the store, the MCD communicates with other PNS's in different proximity zones associated with different departments (seafood, dairy, meat, frozen foods, etc.). For each department, coupons can be sent to the user's MCD as they enter the department. When the user enters the proximity zone near the checkout area, automatic check-out scanners in communication with the user's MCD enable the user to check-out. The MCD transmits collected coupons and customer bank check card information to the proximity network server, allowing the user to pay for groceries in a cashless transaction.

The preceding examples are included to demonstrate specific embodiments of the invention. It should be appreciated by those of skill in the art that the techniques disclosed in the examples which follow represent techniques discovered by the inventor to function well in the practice of the invention, and thus can be considered to constitute preferred modes for its practice. However, it should be understood that the invention is not intended to be limited to the particular forms disclosed. Rather, the different aspects of the disclosed compositions and methods may be utilized in various combinations and/or independently. Thus the invention is not limited to only those combinations shown herein, but rather may include other combinations. Further, those of skill in the art should, in light of the present disclosure, appreciate that many changes can be made in the specific embodiments which are disclosed and still obtain a like or similar result without departing from the spirit and scope of the invention.

REFERENCES

The following references, to the extent that they provide exemplary procedural or other details supplementary to those set forth herein, are specifically incorporated herein by reference:

[SSDP] Goland et al Simple Service Discovery Protocol/1.0 Operating without an Arbiter. Internet Draft—a work in progress. URL as of 27 Apr. 2001: http://www.upnp.org/download/draft_cai_ssdp_v1_03.txt

[HTTPUDP] Y. Y. Goland. Multicast and Unicast UDP HTTP Requests. Internet Draft—a work in progress. URL as of 27 Apr. 2001: http://www.upnp.org/download/draft-goland-http-udp-04.txt

[GENA] Cohen et al. General Event Notification Architecture Base: Client to Arbiter. Internet Draft—a work in progress. URL as of 27 Apr. 2001: http://www.upnp.org/draft-cohen-gena-client-01.txt

[UPnP] Microsoft Corporation. Universal Plug and Play Device Architecture, version 1.0. URL as of 27 Apr. 2001: http://www.upnp.org/download/UPnPDA10_20000613.htm

[SOAP] Box et al. Simple Object Access Protocol (SOAP) 1.1, W3C Note 08 May 2000. URL as of 27 Apr. 2001: http://www.w3.org/TR/2000/NOTE-SOAP-20000508/

[HTTP] Fielding et al. Hypertext Transfer Protocol—HTTP/1.1. RFC 2616, November 1998.

[XML] Bray et al. Extensible Markup Language (XML) 1.0 (Second Edition). W3C Recommendation 6 Oct. 2000. URL as of 27 Apr. 2001: http://www.w3.org/TR/2000/REC-xml-20001006

What is claimed is:

1. A system for dynamically delivering service applications to a user of a mobile computing device, comprising:
a proximity networking server having an associated proximity zone, the
proximity networking server comprising:
an access module for communicating wireless within the associated proximity zone,
a registry of one or more service applications, each service application having one or more associated graphic user interface components, wherein the graphic user interface components are configured to be executable one a mobile computing device;
wherein the proximity networking server is configured to expose said one or more service applications to a mobile computing devices within the associated proximity zone
a client application executable on a mobile computing device,
wherein the client application is operable to establish a wireless connection between the proximity and the mobile computing device when the mobile computing device is located within the proximity zone, wherein the client application is configured to retrieve a list of exposed services from the proximity networking server, and wherein the client application is configured to automatically download and execute the associated graphic user interface component of an exposed service application in response to a request by the user to access said exposed service application, and wherein the exposed service application is executed on the proximity networking server, but is accessible to the user through the associated graphic user interface component executing on the mobile computing device.

2. The system of claim 1, wherein said wireless connection utilizes the universal plug and play protocol.

3. The system of claim 1, wherein the associated graphic user interface component allows the user to utilize the exposed service application by using remote procedure calls sent from the client application to the proximity networking server.

4. The system of claim 3, wherein the proximity networking server further comprises a translation module for translating remote procedure calls received from the client application into the appropriate format for use by the exposed service application, and to translate results from the exposed service application into an output format readable by the associated client graphic user interface component.

5. The system of claim 1, wherein all downloaded graphic user interface components are deleted from the mobile computing device when the mobile computing device leave said associated proximity zone.

6. A method for dynamically providing service applications to mobile computing devices in a proximity networking framework, the proximity networking framework comprising: a proximity networking server having an associated proximity zone, the proximity networking server operable to establish a wireless data connection with a mobile computing device located within said associated proximity zone, the method comprising the steps of:

registering a service application with the proximity networking server, referred to hereinafter as registered service application, wherein the step of registering the service application with the proximity networking server further comprises:

registering an execution component of a service application with the proximity networking server, the execution component operable to be executed by the proximity networking server to provide the functionality of the service application, registering at least one associated graphic user interface component of said registered service application with the proximity networking sever, the graphic user interface component configured to be executed by the mobile computing device to provide a user interface to the execution component, and exposing said registered service application to said mobile computing device coming into said associated proximity zone, referred to hereinafter as the exposed service application;

providing to said mobile computing device the user interface component of the exposed service application;

executing the execution component of the exposed service application on the proximity networking server; and permitting the mobile computing device to utilize the executing exposed service application through the graphic user interface component executing on the mobile computing device.

7. The method of claim 6 further comprises registering an associated access profile of said registered service application with the proximity networking server, and wherein said associated access profile is used to determine whether said registered service application should be exposed to said mobile computing device.

8. The method of claim 6 further comprising retrieving information about mobile computing device or the user of the mobile computing device, referred to hereinafter as retrieved information and using said retrieved information to determine whether said registered service application should be exposed to said mobile computing device.

9. The method of claim 6 further comprising retrieving information about mobile computing device or the user of the mobile computing device, referred to hereinafter as retrieved information and using said retrieved information to customize said exposed service application to said mobile computing device.

* * * * *

UNITED STATES PATENT AND TRADEMARK OFFICE
CERTIFICATE OF CORRECTION

PATENT NO. : 6,931,429 B2
DATED : August 16, 2005
INVENTOR(S) : David Wayne Gouge and William Joseph Ferris It is certified that error appears in the above-identified patent and that said Letters Patent is hereby corrected as shown below:

<u>Column 22,</u>
Line 53, "wireless" should be -- wirelessly --.
Line 59, "one" should be -- on --.
Line 61, delete "a".
Line 67, after "proximity" insert -- networking server --.

Signed and Sealed this

Second Day of May, 2006

JON W. DUDAS
*Director of the United States Patent and Trademark Office*